(12) United States Patent
Ahari et al.

(10) Patent No.: US 12,197,177 B2
(45) Date of Patent: Jan. 14, 2025

(54) UPDATING A DIGITAL OBJECT REPRESENTING A REAL-WORLD OBJECT

(71) Applicant: ABB Schweiz AG, Baden (CH)

(72) Inventors: Nori Ahari, Västerås (SE); Anders Trostén, Västerås (SE)

(73) Assignee: ABB Schweiz AG, Baden (CH)

( * ) Notice: Subject to any disclaimer, the term of this patent is extended or adjusted under 35 U.S.C. 154(b) by 394 days.

(21) Appl. No.: 17/757,424

(22) PCT Filed: Jun. 24, 2020

(86) PCT No.: PCT/EP2020/067635
§ 371 (c)(1),
(2) Date: Jun. 15, 2022

(87) PCT Pub. No.: WO2021/121675
PCT Pub. Date: Jun. 24, 2021

(65) Prior Publication Data
US 2023/0014487 A1    Jan. 19, 2023

Related U.S. Application Data

(60) Provisional application No. 62/949,221, filed on Dec. 17, 2019.

(51) Int. Cl.
*G06F 16/00*    (2019.01)
*G05B 17/02*    (2006.01)
*G06F 16/25*    (2019.01)

(52) U.S. Cl.
CPC ........... *G05B 17/02* (2013.01); *G06F 16/258* (2019.01)

(58) Field of Classification Search
CPC ................ G06F 16/258; G06F 16/00
See application file for complete search history.

(56) References Cited

U.S. PATENT DOCUMENTS 8,056,056 B2 * 11/2011 Eldridge .................. G06F 8/71
717/121
10,719,526 B2 * 7/2020 Burton ................. G06F 16/235
(Continued)

FOREIGN PATENT DOCUMENTS

| CN | 102081662 A | 6/2011 |
|---|---|---|
| CN | 102200993 A | 9/2011 |

(Continued)

OTHER PUBLICATIONS

Chinese Office Action; Application No. 2020800855380; Completed: Apr. 16, 2024; Issued: Apr. 18, 2024; 23 Pages.
(Continued)

*Primary Examiner* — Cheryl Lewis
(74) *Attorney, Agent, or Firm* — Whitmyer IP Group LLC

(57) ABSTRACT

A method, computer program and computer program product for allowing update of digital objects as well as to an edge node and process control system including an edge node. The edge node obtains a copy of an original digital object from a process control server, the original object having a number of aspects and being provided according to a first process control data format, provides the copy as a modified object in a second data format that is open for applications external to the process control system, in which second data format the modified object compromises a number of data models receive an update of the modified object from the application, where the update includes a new data model.

21 Claims, 5 Drawing Sheets

(56) References Cited

U.S. PATENT DOCUMENTS

| | | |
|---|---|---|
| 2007/0061786 A1 | 3/2007 | Zhou et al. |
| 2013/0060817 A1 | 3/2013 | Koponen et al. |
| 2018/0121259 A1 | 5/2018 | Bussler et al. |
| 2018/0232404 A1 | 8/2018 | Bhatti |
| 2019/0310991 A1* | 10/2019 | Burton ................ G06F 16/2358 |

FOREIGN PATENT DOCUMENTS

| | | |
|---|---|---|
| CN | 109154926 A | 1/2019 |
| WO | 2013000011 A1 | 1/2013 |

OTHER PUBLICATIONS

Crockford, Douglas; "JSON—JavaScript Object Notation"; Mar. 2001; Retrieved: Wikipedia, Dec. 16, 2019; Verified: Jun. 15, 2022; 21 Pages.

International Preliminary Report on Patentability; Application No. PCT/EP2020/067635; Issued: Feb. 3, 2022; 24 Pages.

International Search Report and Written Opinion of the International Searching Authority; Application No. PCT/EP2020/067635; Completed: Sep. 21, 2020; Mailing Date: Oct. 5, 2020; 16 Pages.

Written Opinion of the International Preliminary Examining Authority: Application No. PCT/EP2020/067635; Issued: Nov. 10, 2021; 8 Pages.

* cited by examiner

UPDATING A DIGITAL OBJECT REPRESENTING A REAL-WORLD OBJECT

TECHNICAL FIELD

The present invention relates to a method, computer program and computer program product for allowing update of digital objects as well as to an edge node and process control system comprising an edge node.

BACKGROUND

Object based computer systems are today used for controlling industrial processes.

In this case the objects may be provided according to a first data process control format, such as a format that is based on the COM technology. A digital object then represents a real-world object used in the control and this digital object typically has a number of aspects.

These process control objects are typically kept in a closed environment in order to avoid negative influences on the process control.

If new software with a new function is to be installed and integrated into the above-mentioned type of system that runs core process functionality, the following situation is at hand:
  Each new function needs to comply to the same software technology as the underlying system supports.
  Flaws of each new function may jeopardize the stability of the control system.
  The life cycle of each new function is tightly coupled with the life cycle of the core control system.

This results in unwillingness from the customer side to upgrade existing software and to install new software that adds functions.

It is therefore of interest to provide updates in relation to such a digital object of the above-described type in a freer way without jeopardizing the control.

SUMMARY

The present invention is directed towards updating of digital objects representing real-world objects of a process control system.

This is according to a first aspect achieved through a method for allowing update of a digital object representing a real-world object in a process control system, the method being performed by an edge node of the process control system and comprising:
  obtaining a copy of an original digital object from a process control server, the original object having a number of aspects and being provided according to a first process control data format,
  providing the copy as a modified object in a second data format that is open for applications external to the process control system, in which second data format the modified object compromises a number of data models, said data models comprising data models corresponding to the aspects of the original object,
  giving an application access to the modified object, and
  receiving an update of the modified object from the application, where the update comprises a new data model.

This object is according to a second aspect achieved through an edge node in a process control system, the edge node comprising a processor and memory, the memory comprising computer instructions executable by the processor, whereby the edge node is operative to:
  obtain a copy of an original digital object from a process control server, the original object having a number of aspects and being provided according to a first process control data format,
  provide the copy as a modified object in a second data format that is open for applications external to the process control system, in which second data format the modified object compromises a number of data models, said data models comprising data models corresponding to the aspects of the original object,
  give an application access to the modified object, and
  receive an update of the modified object from the application, where the update comprises a new data model.

The object is according to a third aspect achieved through a computer program for allowing update of a digital object representing a real-world object in a process control system, the computer program comprising computer program code which when run in an edge node causes the edge node to:
  obtain a copy of an original digital object from the process control server, the original object having a number of aspects and being provided according to a first process control data format,
  provide the copy as a modified object in a second data format that is open for applications external to the process control system, in which second data format the modified object compromises a number of data models, said data models comprising data models corresponding to the aspects of the original object,
  give an application access to the modified object, and
  receive an update of the modified object from the application, where the update comprises a new data model.

The object is according to a fourth aspect achieved through a computer program product for allowing update of a digital object representing a real-world object in a process control system, the computer program product comprising a data carrier with computer program code configured to cause an edge node to, when the computer program code is loaded into the edge node:
  obtain a copy of an original digital object from the process control server, the original object having a number of aspects and being provided according to a first process control data format,
  provide the copy as a modified object in a second data format that is open for applications external to the process control system, in which second data format the modified object compromises a number of data models, said data models comprising data models corresponding to the aspects of the original object,
  give an application access to the modified object, and
  receive an update of the modified object from the application, where the update comprises a new data model.

According to a first variation of the first and second aspects, the modified object also comprises rules for data model usage and the giving of access to the modified object comprises giving access to the rules so that the update of the modified object can be made following the rules.

According to a second variation of the first aspect, the method further comprises, in an application running in the edge node, accessing the modified object, determining a new data model based on the rules of usage and updating the modified object through adding the new data model.

According to a corresponding variation of the second aspect, the edge node is further operative to implement an application configured to access the modified object, determine a new data model based on the rules of usage and update the modified object through adding the new data model.

According to a third variation of the first aspect, the method further comprises allowing the application access to process control data defined in a process control data model, wherein the new data model in the updated modified object comprises a definition of new data that is determined based on processing of the process control data.

According to a corresponding variation of the second aspect, the giving of access comprises allowing the application access to process control data defined in a process control data model and the new data model in the updated modified object comprises a definition of new data that has been determined based on processing of the process control data.

According to a fourth variation of the first aspect, the method further comprises applying new data in the process control system, where the new data has been obtained through processing of the process control data.

According to a corresponding variation of the second aspect, the edge node is further operative to apply new data in the process control system, where the new data has been obtained through processing of the process control data.

According to a fifth variation of the first and second aspects, the giving of access to the modified object comprises placing the modified object and at least some of its data models in a database where they are discoverable by the application.

According to a sixth variation of the first and second aspects, the first data format is based on the Component Object Model technology and the second data format is based on the JavaScript Object Notation data format.

According to a seventh variation of the first and second aspects, each data model represents a capability of the real-world object.

According to an eighth variation of the first aspect, data generated by the application related to steady-state operation of the process is kept from entering a core process control system comprising the process control server.

According to a corresponding variation of the second aspect, the edge node is further operative to keep data generated by the application related to steady-state operation of the process from entering a core process control system comprising the process control server.

The invention has a number of advantages. It provides a simple and flexible model that allows customers to install and upgrade individual applications that adds capabilities to an Industrial Control System without affecting the Core Industrial Control System. This allows the applications to be developed and evolved with a fast pace, disconnected from the lifecycle of the Core Industrial Control System. Capabilities can be added without affecting other capabilities.

BRIEF DESCRIPTION OF THE DRAWINGS

The present invention will in the following be described with reference being made to the accompanying drawings, where FIG. 1 schematically shows a core process control system operating an industrial process using process control devices, FIG. 2 schematically shows one realization of an object handling unit and a container stored in a server of the core process control system for handling objects according to a first data format, FIG. 3 schematically shows the process control server communicating with an edge node in the process control system, FIG. 4 schematically shows the edge node communicating with a first remote application and a second remote application being located outside the process control system, FIG. 5 schematically shows an object according to a second data format.

DETAILED DESCRIPTION

In the following, a detailed description of preferred embodiments will be given.

Figure 1:
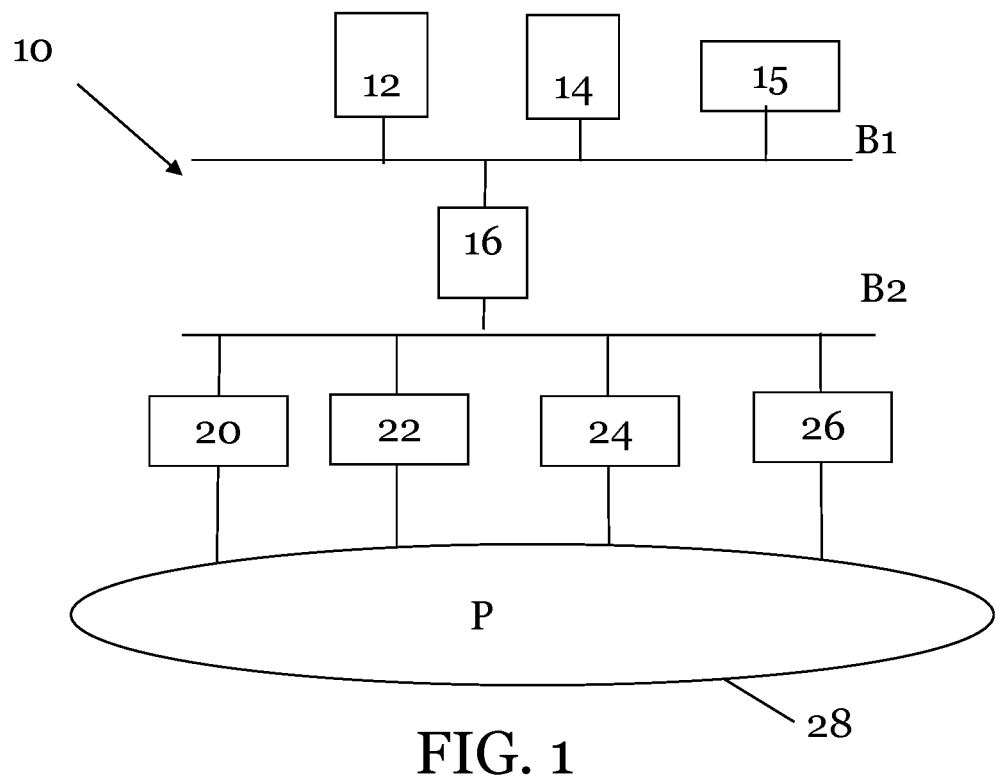

FIG. 1 schematically shows a core process control system 10, which core process control system may be provided in an industrial plant. The core process control system 10 implements computerized process control for controlling an industrial process P. Examples of industrial processes that may be controlled are electrical power generation, transmission and distribution processes, water purification and distribution processes, oil and gas production and distribution processes, petrochemical, chemical, pharmaceutical and food processes, and pulp and paper production processes. These are just some examples of processes where the system can be applied. There exist countless other industrial processes. The processes may also be other types of industrial processes such as the manufacturing of goods. A process may be monitored through one or more process monitoring computers, which communicate with a computer or server handling monitoring and control of the process.

In FIG. 1 the core process control system 10 therefore includes a number of process monitoring computers 12 and 14. These computers may here also be considered to form operator terminals and/or engineering terminals and are connected to a first data bus B1. There is furthermore a second data bus B2 and between the first and second data busses B1 and B2 there is connected a first control computer 16 that is a process control server. To the first data bus B1 there is also connected a communication interface 15 allowing communication with an edge node of the process control system.

To the second data bus B2 there is also connected a number of further devices 20, 22, 24 and 26. These further devices 20, 22, 24 and 26 are field devices, which are process interface devices that are interfaces to a process P being controlled. There is in this case a first 20, second 22, third 24 and fourth 26 field device. A field device is typically an interface via which measurements of the process are being made and to which control commands are given. The measurements may be measurements of physical properties related to the process P. A field device may as an example be a tank and another as an example a centrifuge. The process control server 16 may be involved in controlling the process P based on inputs from field devices, such as from sensors of field devices, and actuating the same or other field devices, such as valves, based on the inputs. The field devices and computers are all examples of process control devices that are also real-world objects involved in the control of the process P.

Figure 2:
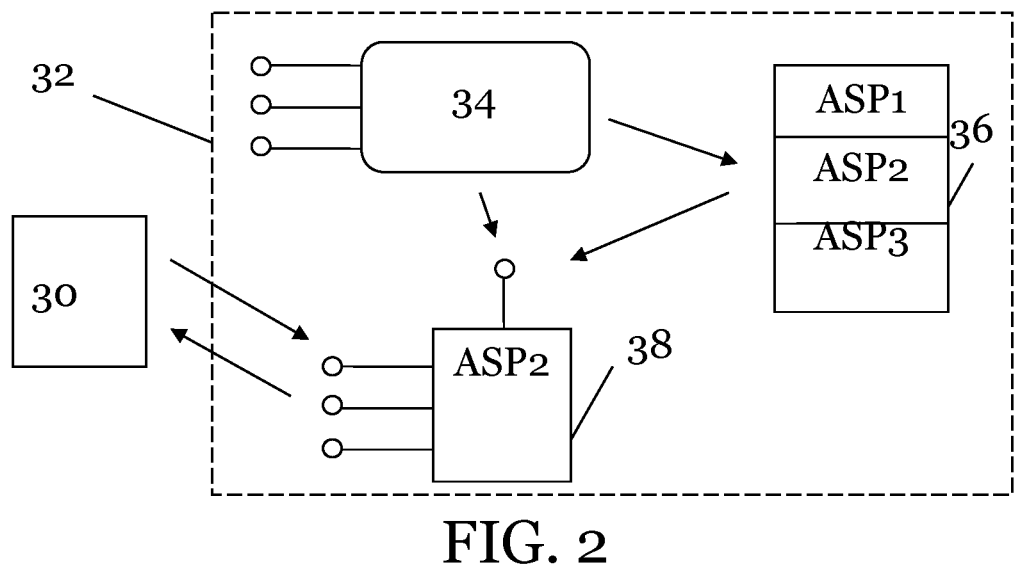

In order to control the process interface devices of a process, containers may be used, where there may be one container for each process interface device. FIG. 2 shows a block schematic of a first object handling unit 30 and object store 32 that are a part of the process control server 16, where the object store 32 comprises a container 34 according to a first data format, an aspect Asp2 38 and an aspect lookup table 36.

The container 34 is a so-called Component Object Model (COM) object having a number of interfaces, where three are shown in FIG. 2.

Through the container 34, the object handling unit 30 can invoke a function that is related to an aspect that is held by the container 34. The object handling unit 30 does this by querying the container 34 for an interface to this function, without knowing the identity of the application that implements the function for which it is seeking an interface. If the container has an aspect that supports the interface, then a reference to the interface is returned as some form of pointer to where that interface may be found.

The container 34 thus holds a number of aspects, of which one Asp2 38 is shown in FIG. 2. Each aspect, which may also be provided as a COM object, is related to a process interface device provided in the process control system section 10 or a group of process interface devices. An aspect represents one facet of this real-world object and is responsible for all operations on that facet of the object and its data.

Thus, for a tank for example, one aspect could represent a physical location, another aspect could represent a blue print diagram of the tank, another a security descriptor for the tank, another aspect could represent a control for an operation of the tank and yet another aspect could represent documentation about the tank. The aspect that represents the facet has an association to a function of an application that can, referring to the above example, display the blue-print diagram control the operation of the pump or apply security settings. All aspects are created through an aspect category. The aspect category contains information that is shared between all instances of the category. Each aspect category refers to one aspect type. This aspect type describes the implementation of an aspect. The container does itself not hold any data, but data is provided in aspects or in relation to aspects. An aspect belongs to an aspect type (through its category) which lists the set of COM objects that implements the functionality of the aspect. This implementation is provided by an object, referred to as an Aspect System Object (ASO), which is a COM compliant object. Stated differently, the aspect type contains binding information between an aspect and the one or more applications that implement its functionality.

The container furthermore has access to an aspect lookup table 52, through which it may locate an aspect.

Thus, the first object handling unit 30 when needing to access a facet of the real-world object connects to the container 34 and requests an interface associated with said facet. The container then locates an aspect 54 associated with the facet via the aspect table 52, interrogates the aspect regarding its interfaces, receives information of an interface and returns the interface, through which the object handling unit may connect to the aspect for retrieving data, control the real-world object, etc.

The container is therefore a digital object that represents a real-world object in the process control system section and this digital object has a number of aspects pertaining to different facets of the object. As will be seen later the object is an original digital object that will be copied to an edge node. Moreover, this original digital object is provided according to a first process control data format, which data format in this case employs the COM technology with the digital object representing the real-world object and the aspects of this digital object being provided as a number of linked COM objects. This first process control data format is furthermore a proprietary data format.

Figure 3:
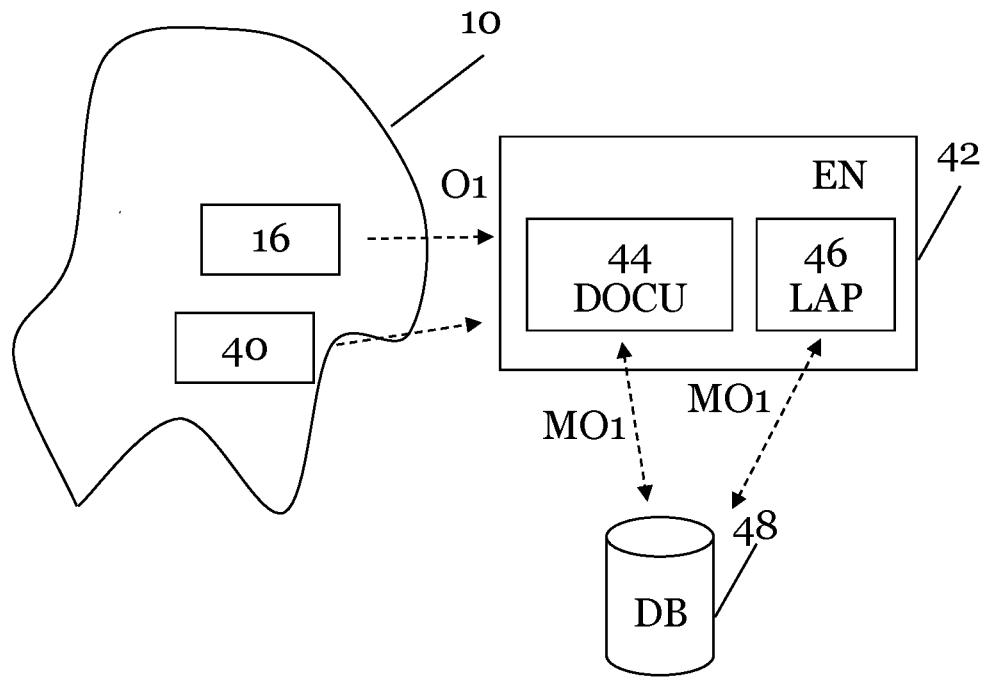

FIG. 3 schematically shows the core process control system 10 comprising the process control server 16. In the figure there is also an edge node EN 42. The core process control system 10 and edge node may be considered as being provided as parts of an enlarged process control system. The process control server 16 communicates with a digital object control unit DOCU 44 in the edge node 42. There is also an optional local measurement device 40 in the core process control system 10 communicating with the digital object control unit of the edge node. In the edge node 42 there is also a local application LAP 46. The edge node 42 as well as the local application 46 also communicates with a data base DB 48. Also, the data base 48 may be a part of the enlarged process control system. In the figure it can more particularly be seen that the process control server 16 sends a first digital object O1 to the edge node 42 and the digital object control unit 44 and local application 46 store and fetch a modified first object MO1 in the database 48. The local measurement device 40 sends local measurement data related to the physical object for which the first digital object O1 is provided to the digital object control unit 44 of the edge node 42. These are measurements of devices in the core process control system, which are however not used in the control.

Figure 4:
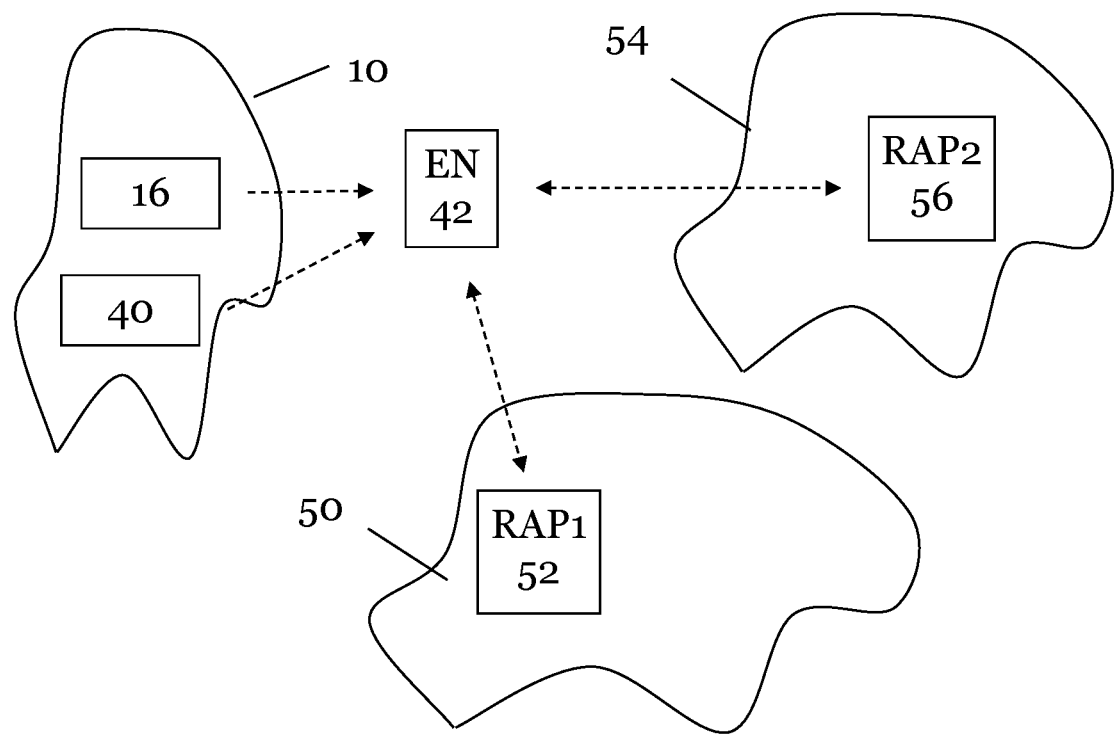

FIG. 4 schematically shows the edge node 42 in the process control system 40 communicating with the process control server 16 and local measurement device 40 in the core process control system 10, with a first remote application RAP1 52 in another system 50 and with a second remote application RAP2 56 in a cloud environment 54.

Figure 5:
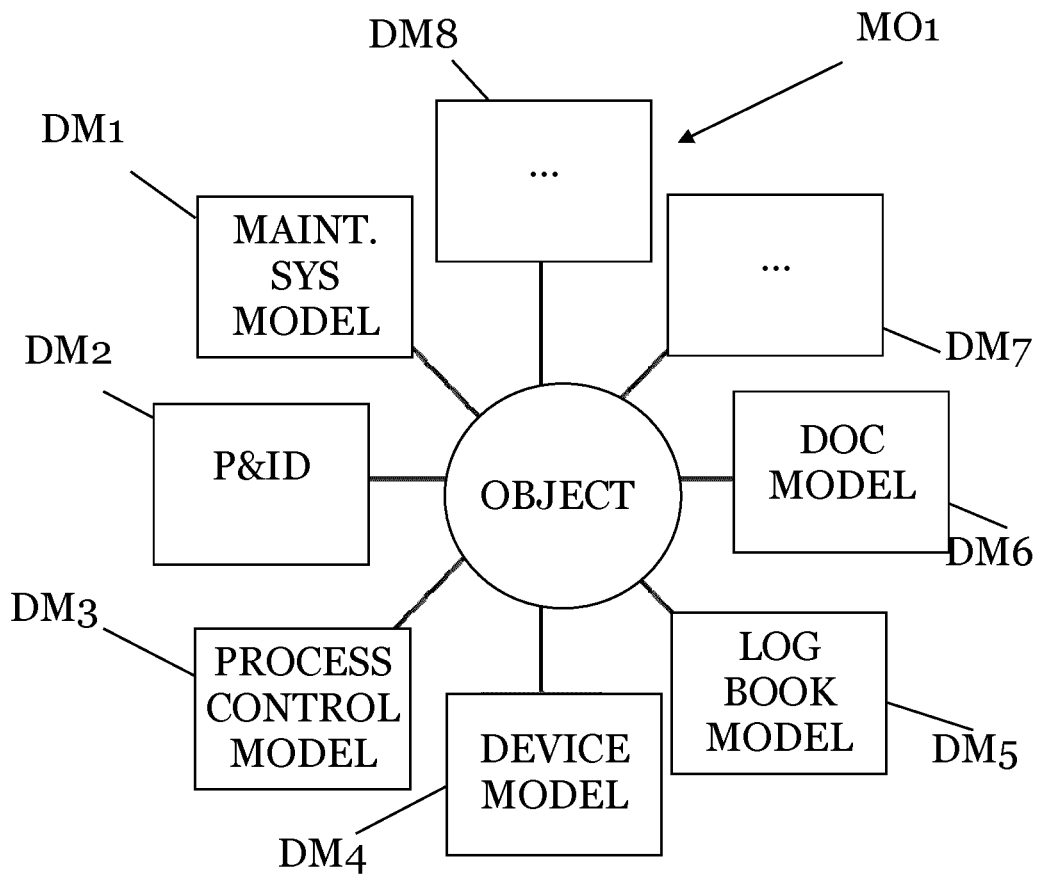

FIG. 5 shows a modified objected MO1 according to a second data format, where the modified object MO1 comprises a number of data models and in this example, there are eight data models. There is a first data model DM1, which may be a maintenance system model, there is a second data model DM2, which may be a piping and instrumentation (P & ID) data model, there is a third data model DM3 that may be process control model, there is a fourth data model DM4 that may be a device model, there is a fifth data model DM5 that may be a log book model and there is a sixth data model DM6 that may be a documentation data model. Finally, there is a seventh and an eighth data model DM7 and DM8, the contents of which have not been specified.

Figure 6:
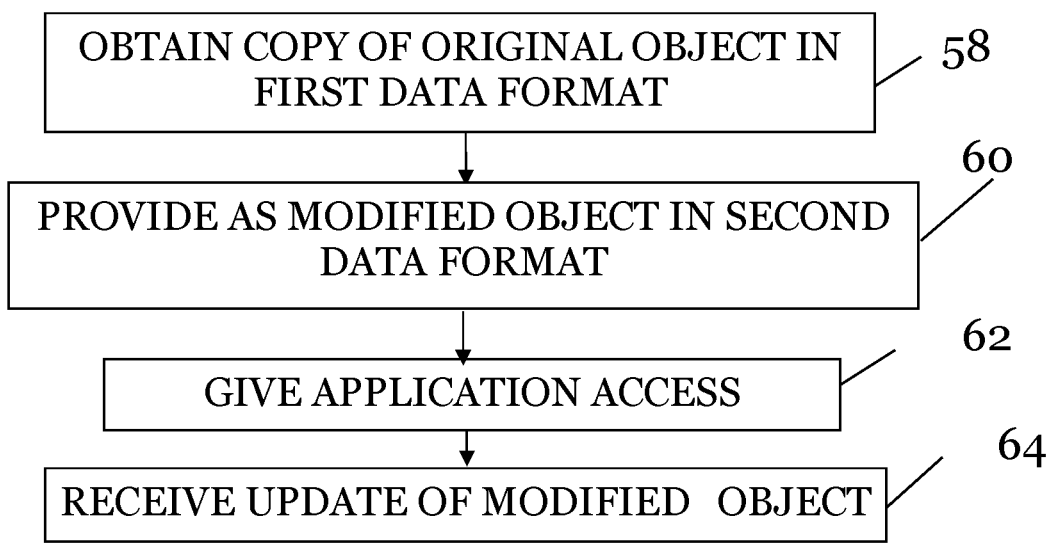
FIG. 6 shows a number of method step in a first variation of a method being performed in the edge node.

The general operation of the edge node 42 and more particularly of the digital object control unit 44 in the edge node 42 will now be described with reference being made to FIG. 6, which shows a number of method steps in a method of operating the digital object control unit 44 of the edge node 42.

The digital object control unit 44 first obtains a copy of an original object O1 from the process control server 16, step 58, where the original object O1 has a number of aspects and is provided according to the first proprietary process control data format, i.e. as a number of linked COM objects. The original object is thus a digital object in the process control server 16. The obtaining may be done through the process control server 16 sending a copy of the original object via interface 15 and the digital object control unit 44 receiving it or through that digital object control unit 44 fetching a copy of the original object and its aspects from the process control server 16 via interface 15.

The digital object control unit 44 then provides the copy as a modified object MO1 in a second data format that can be understood by third-party developers, step 60. The second data format may be a format that is open for applications external to the process control system. The format may employ the JavaScript Open Notation (JSON) format. However also other formats, such as XML are possible. The format is thereby a format that third parties may be able to use in developing applications for the process control system 40. Moreover, the modified object MO1 comprises a number of data models corresponding to the aspects of the original object. These models may comprise at least one process control model defining how the object is used in the process control. As an example, the data models may comprise the first, second, third, fourth, fifth and sixth data models DM1, DM2, DM3, DM4, DM5 and DM6. It may additionally form a data model for the local measurement data.

The digital object control unit 44 then gives one or more applications access to the modified object MO1, step 62. The giving of access may comprise allowing the object and one or more of its data models to be discovered. It may also involve giving reading and writing rights to the one or more applications. The applications that are given access may be applications used for generating additional functions for the modified digital object MO1, where these applications may comprise the local application 46 in the process control system 40, the first remote application 52 in another system 52 or the second remote application 56 in the cloud 54.

An application, such as the first remote application 52, may then access the modified object MO1 having the second data format. The application may more particularly update the modified object MO1 with one or more data models, such as for instance the seventh and eighth data models DM7 and DM8.

After this has been done the digital object control unit may receive an update of the modified object from the application, step 64.

The modified data model may as an example define a processing of process control data from the process control data model together with data from another part of the system or from another external source and providing new data of the new data model based on the defined processing.

Figure 7:
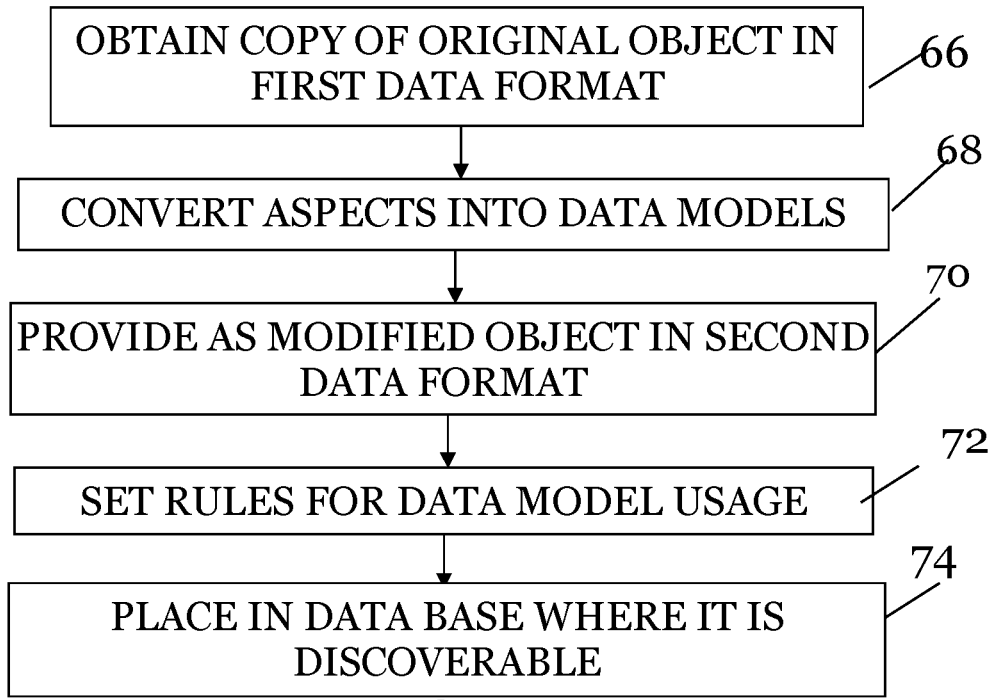
FIG. 7 shows a number of method steps performed in a second variation of a method being carried out in the digital object control unit of the edge node.
Figure 8:
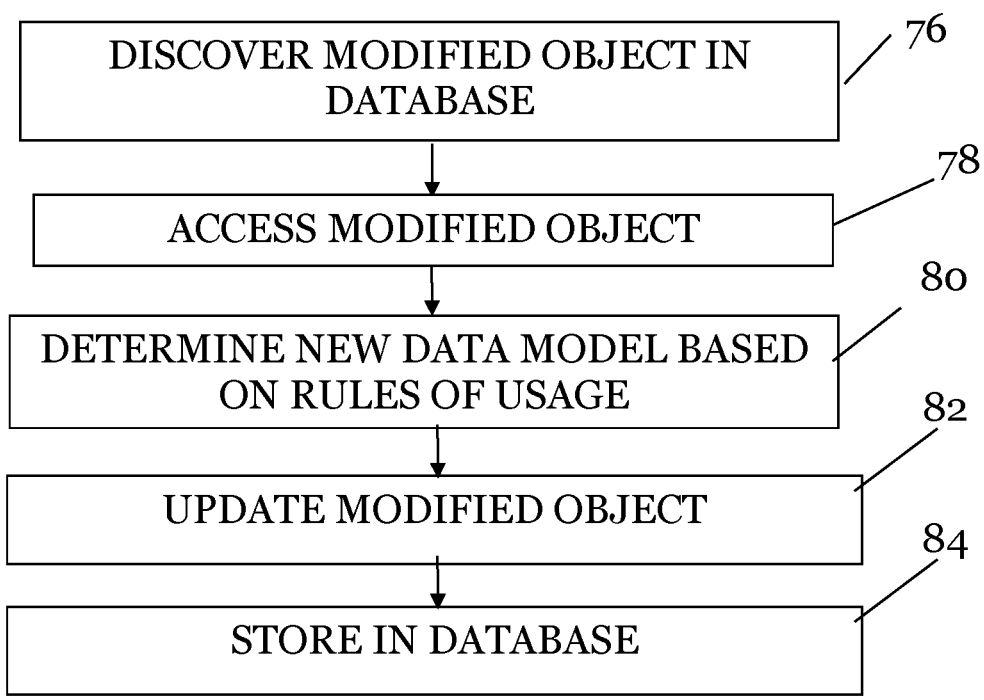
FIG. 8 shows a number of method steps of a method being performed by a local application in the edge node, FIG. 9 schematically shows one realization of the edge node as a computer with associated program memory with computer program code for realizing the edge node functionality, and FIG. 10 schematically shows a computer program product in the form of a CD Rom disc comprising said computer program code for realizing the edge node functionality carrying out at least of the method steps.

Now a second embodiment will be described with reference being made to FIGS. 7 and 8, where FIG. 7 shows a number of method steps in a variation of the method of operating the digital object control unit 44 of the edge node 42 and FIG. 8 shows a number of corresponding method steps being performed in the local application 46 of the edge node 42.

The digital object control unit 44 first obtains a copy of an original object O1 from the process control server 16, step 66, where the original object O1 again has a number of aspects and is provided according to the first process control data format, e.g. a format that is based on the COM technology.

The digital object control unit 44 then converts the aspects into data models, step 68. This may be done through converting each aspect into a corresponding separate JSON file defining the data model. The digital object control unit 44 then provides the copy as a modified object MO1 in the second data format, step 70. This may be done through creating a separate JSON file for the object level, which file comprises links to the different individual data model files.

The digital object control unit 44 may additionally set up rules for data model usage, step 72. The rules may comprise rules regarding dependencies of the data models and rules regarding how the data defined by the data models is to be used. These rules may be stored as one or more separate JSON files to which the object level file refers, or they may be included in the object level file.

Thereafter the digital object control unit 44 places the modified object MO1 in the database 48, step 74, where it is discoverable and read/writable by various applications, for instance all the applications 46, 52 and 56. The applications also have access to the rules in the discoverable modified object. Thereby they are able to update the modified object following the rules.

An application, such as the local application 46, may then discover the modified object MO1 in the data base 48, step 76. It may then further access the modified object MO1, step 78. Once having accessed the modified object MO1 the application may determine one or more new data models based on the rules of usage, step 80. As an example, it may determine the seventh and eighth data models DM7 and DM8. At least one of the new data models may as an example involve processing of process control data from the process control data model DM3. The new data model may therefore comprise a definition of processing on the process control data and new data that is the result of this processing. The new data model may therefore define new data that is obtained based on processing of the process control data. After one or more new data models have been determined, the application 46 may then update the modified object MO1 with the new data models DM7 and DM8, step 82, and then store the updated modified data model in the database 48, step 84, from where it can be accessed by the digital object control unit 44 and other applications 52 and 56.

It is for instance possible that one of the new data models is the data model for the local measurement data from the local measurement device.

The digital object control unit 44 in the edge node 42 may now receive, in relation to the modified object, process control data via the original digital object and allow the application that updated the modified object access to the process control data. It may also provide the application with the local measurement data. The application may then process the process control data and the local measurement data and determine the new data based on this processing. The digital object control unit may now apply the new data that has been obtained through processing of the process control data in the process control system. The new data may thus be used in the process control system. The new data may as an example be time data indicating when to perform maintenance of the corresponding real-world object. This maintenance data may then be used as a trigger for stopping the process control in the core process control system for having the maintenance performed. When maintenance is to be performed, the process control may then be stopped in an orderly fashion in the core process control system.

It may be important that the application is not allowed to influence the actual control being performed in the core process control system. The application may thus not be allowed to influence steady-state operation of the core process control system. For this reason, the digital object control unit may keep data generated by the application related to steady-state operation of the process from entering the core process control system. It may thus stop data generated by the application from entering the core process control system when this data is related to steady-state operation of the process. It should be realized that this type of influence inhibiting may also apply for fault handling.

It can in this way be seen that edge computing, realized through the edge node, has been introduced in the process control system, which is an industrial control system.

Edge computing in the industrial control system domain provides an overall solution for deployment of industrial software applications either near the source on the edge node(s) or in the cloud thus enabling edge and cloud computing capabilities for the industrial control system. Edge nodes enable a Software as a Service (SaaS) centrally managed hosting and delivery model, via the cloud, to a fleet of edge nodes installed on premise and integrated with the industrial control system and the fleet of the connected devices.

The local application is in this case an example an edge application. An edge application comprises one or more edge software modules that interact with other edge modules via an edge runtime platform. An edge module is software that provides a service compliant with a set of defined rules. The application composition, requirements, dependencies etc., may be described in an application model. Edge applications may be managed by the end user via a cloud service An edge node is in turn a computer connected to and consuming data from the industrial control system, i.e. from the previously mentioned core process control system. The edge node provides a cloud connected software platform for applications to run near the industrial control system (edge computing).

A cloud-based service for installation, configuration, and management of applications on a fleet of edge nodes may be provided.

The digital object control unit may provide a central information model storage, where the modified object is provided in a Global information model providing new capabilities (represented as object models) for each object (represented as an object). Different applications, e.g. edge or cloud hosted, can extend information related to an object by providing new models to the same object. Each model represents a capability.

Each application is associated with the model(s) it provides. An application providing models can run either on the same edge, different edge nodes or in the cloud (distributed).

All or a subset of the objects and their models are stored and made available in the central storage, such as the database. An edge application can dynamically discover and access any model for an object by interacting with the central information model service. By discovering a model an application can interact with the application associated with the model.

The modified object may be created using an ability platform. The ability platform may with advantage be provided together with the database, for instance in the cloud. The ability platform may be provided based on Open Platform Communication Unified Architecture (OPC UA) technology, where the database may be provided by an OPC UA server. The digital object control unit, the local application as well as the first and second remote applications may additionally comprise connection modules, which may also be provided using the OPC UA technology.

The ability platform may provide information model services and edge configuration services that can be used to implement a centrally hosted engineering tool or API to provide engineering tools, such as SaaS.

This provides a multi-tenant Platform as a Service (PaaS) to implement globally always available connectivity engineering tools from a central cloud deployment.

The information of what a connect module should expose and how to map this information may be defined using a connect engineering tool, which may be centrally located, for instance at the database in the cloud and the resulting configuration data is stored in the ability platform and associated with the edge Connect module.

A Connect module may subscribe to the configuration data, such as the modified data object, and receive configuration data updates when the tool publishes changes.

The configuration data may be security stored in the cloud, either as part of the information model (config models) and could optionally also contain configuration files.

The UA engineering tool allows a user to discover and list OPC UA Servers via a UA Connect client.

The UA Engineering tool may request node set files for each UA Server, where a node set file may be a JavaScript file with JSON format or an XML file with a modified digital object. The files may be cached in the File Storage service, for each connected UA Server, with UA Server address space version information. This means that the above-mentioned database provides as file storage service for the above-described modified digital object and the object may be stored in an associated UA Server address space.

Nodeset files can also be imported to the UA Engineering tool for providing offline engineering capabilities.

A user can perform mapping of UA Object types to Ability Types. Mapping can be one to one (auto) or more complex re-shaping of types. The user may select a subset of the UA Server's address space to map to information object models and then define data collection configuration for the mapped information.

The configuration may then be stored in information module per mapped object instance with UA type, UA instance mapping and data collection information.

For a cloud (central point) hosting, the engineering tool is capable of configuring a fleet of edge nodes, each with a set of connected OPC UA data sources, where the digital object control unit may provide such a data source delivering data to the first, second and third applications.

An edge node may be continuously connected to the UA engineering tool, or it may be connected on demand.

For a continuously connected edge node, the cloud hosted UA Engineering tool can be used directly to configure OPC UA mapping and data collection.

For edge nodes that get connected on demand, the UA Engineering tool may be hosted on the Edge node and can be used by any computer connected to a local LAN network in which the edge node is provided.

Support for export/import of mapping between cloud and local edge node could be added if needed.

Once configured a data stream can be established between the OPC UA data source and an application that subscribes to the data, the mapped data may be forwarded to the edge applications (in context of mapped to object models) and optionally also forwarded to cloud applications using the same mapped object model context.

An application subscribing to data via the UA Connect client associated with the application, such as an UA Connect client in the local application or the first and second remote applications. The UA Connect client subscribes for data as defined in the configuration. Data is published to the edge platform using the defined mapping.

The information models and the associated runtime data is made available to other edge applications via the edge platform.

Data can be published to cloud platform if desired (configuration of edge data routing).

UA Connect is agnostic to Edge connection model.

The mapping and runtime data publishing principles may be applied both to UA client server mode and UA publish/subscribe mode.

The invention has a number of advantages. It provides a simple and flexible model that allows customers to install and upgrade individual applications that adds capabilities to an Industrial Control System without affecting the Core Industrial Control System.

This allows the applications to be developed and evolved with a fast pace, disconnected from the lifecycle of the Core Industrial Control System. Capabilities can be added without affecting other capabilities.

Figure 9:
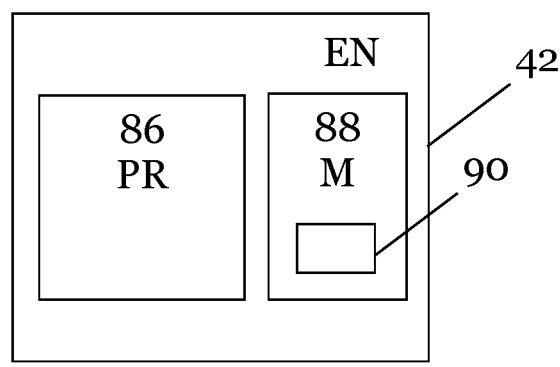
Figure 10:
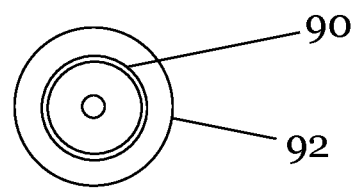

The edge node 42 may, as can be seen in FIG. 9, be provided in the form of one or more processors PR 86 together with computer program memory M 88 including computer program code 90 for performing its functions, i.e. for implementing the digital object control unit and the local application. This computer program code may also be provided on one or more data carriers which perform the functionality of the edge node when the program code is being loaded into a computer forming the edge node. One such data carrier 92 with computer program code 90, in the form of a CD ROM disc, is schematically shown in FIG. 10. Such computer program may as an alternative be provided on another server and downloaded therefrom into the edge node.

The invention claimed is:

1. A method for allowing update of a digital object representing a real-world object in a process control system, the method being performed by an edge node of the process control system and comprising:
    obtaining a copy of an original digital object from a process control server, the original object having a number of aspects and being provided according to a first process control data format, where an aspect represents a facet of the real-world object and is responsible for all operations on that facet of the object and its data, providing the copy as a modified object in a second data format that is open for applications external to the process control system through converting the aspects into data models, said second data format thereby comprising data models corresponding to the aspects of the original object, where one data model is a process control model defining how the real-world object is used in the process control, giving an application access to the modified object, and receiving an update of the modified object from the application, where the update comprises a new data model comprising a definition of processing on process control data from the process control data model and new data that is the result of the processing.

2. The method according to claim 1, wherein the modified object also comprises rules for data model usage and the giving of access to the modified object comprises giving access to the rules so that the update of the modified object can be made following the rules.

3. The method according to claim 2, further comprising, in an application running in the edge node, accessing the modified object, determining a new data model based on the rules of usage and updating the modified object through adding the new data model.

4. The method according to claim 1, further comprising allowing the application access to process control data defined in a process control data model, wherein the new data model in the updated modified object comprises a definition of new data that is determined based on processing of the process control data.

5. The method according to claim 4, further comprising applying new data in the process control system, said new data having been obtained through processing of the process control data.

6. The method according to claim 1, wherein the giving of access to the modified object comprises placing the modified object and at least some of its data models in a database where they are discoverable by the application.

7. The method according to claim 1, wherein the first data format is based on the Component Object Model technology and the second data format is based on the JavaScript Object Notation data format.

8. The method according to claim 1, wherein each data model represents a capability of the real-world object.

9. The method according to claim 1, wherein data generated by the application related to steady-state operation of the process is kept from entering a core process control system comprising the process control server.

10. An edge node in a process control system, the edge node comprising a processor and memory, said memory comprising computer instructions executable by said processor, whereby said edge node is operative to:
    obtain a copy of an original digital object from a process control server, the original object having a number of aspects and being provided according to a first process control data format, where and aspect represents a facet of the real-world object and is responsible for all operations on the facet of the object and its date,
    provide the copy as a modified object in a second data format that is open for applications external to the process control system through converting aspects into data model said second data format thereby comprising data models corresponding to the aspects of the original object, where one data model is a process control model defining how the real-world object is used in the process control,
    give an application access to the modified object, and
    receive an update of the modified object from the application, where the update comprises a new data model.

11. The edge node according to claim 10, wherein the modified object also comprises rules for data model usage and the giving of access to the modified object comprises giving access to the rules so that the update of the modified object can be made following the rules.

12. The edge node according to claim 10, being further operative to implement an application configured to access the modified object, determine a new data model based on the rules of usage and update the modified object through adding the new data model.

13. The edge node according to claim 10, wherein the giving of access comprises allowing the application access to process control data defined in a process control data model and the new data model in the updated modified object comprises a definition of new data that has been determined based on processing of the process control data.

14. The edge node according to claim 13, being further operative to apply new data in the process control system, said new data having been obtained through processing of the process control data.

15. The edge node according to claim 10, wherein the giving of access to the modified object comprises placing the modified object and at least some of its data models in a database where they are discoverable by the application.

16. The edge node according to claim 10, wherein the first data format is based on the Component Object Model technology and the second data format is based on the JavaScript Object Notation data format.

17. The edge node according to claim 10, wherein each data model represents a capability of the real-world object.

18. The edge node according to claim 10, being further operative to keep data generated by the application related to steady-state operation of the process from entering a core process control system comprising the process control server.

19. A process control system comprising an edge node and a process control server controlling a real-world object using an original digital object representing the real world object, wherein the original object has a number of aspects and is provided according to a first process control data format, where an aspect represents a facet of the real-world object and is responsible for all operations on that face of the object and its data, the edge node being configured to:
  obtain a copy of an original digital object from the process control server,
  provide the copy as a modified object in a second data format that is open for applications external to the process control system through converting aspects into data models, said second data format thereby comprising data models corresponding to the aspects of the original object, where one model is a process control model defining how the real-world object is used in the process control,
  give an application access to the modified object, and
  receive an update of the modified object from the application, where the update comprises a new data model.

20. A computer program for allowing update of a digital object representing a real-world object in a process control system, said computer program comprising computer program code which when run in an edge node causes the edge node to:
  obtain a copy of an original digital object from the process control server, the original object having a number of aspects and being provided according to a first process control data format, where an aspect represents a facet of the real-world object and is responsible for all operations on that facet of the object and its data,
  provide the copy as a modified object in a second data format through converting the aspects into data models, said second data format thereby comprising data models corresponding to the aspects of the original object, where one data model is a process control model defining how the real-world object is used in the process control,
  give an application access to the modified object, and
  receive an update of the modified object from the application, where the update comprises a new data model.

21. A computer program product for allowing update of a digital object representing a real-world object in a process control system, said computer program product comprising a data carrier with computer program code configured to cause an edge node to, when said computer program code is loaded into said edge node:
  obtain a copy of an original digital object from the process control server, the original object having a number of aspects and being provided according to a first process control data format, where an
  aspect represents a facet of the real-world object and is responsible for all operations on that facet of the object and its data,
  provide the copy as a modified object in a second data format that is open for applications external to the process control system through converting the aspects into data models, said second data format thereby comprising data models corresponding to the aspects of the original object, where one data model is a process control model defining how the real-world object is used in the process control,
  give an application access to the modified object, and
  receive an update of the modified object from the application, where the update comprises a new data model.

* * * * *